Patented Nov. 28, 1944

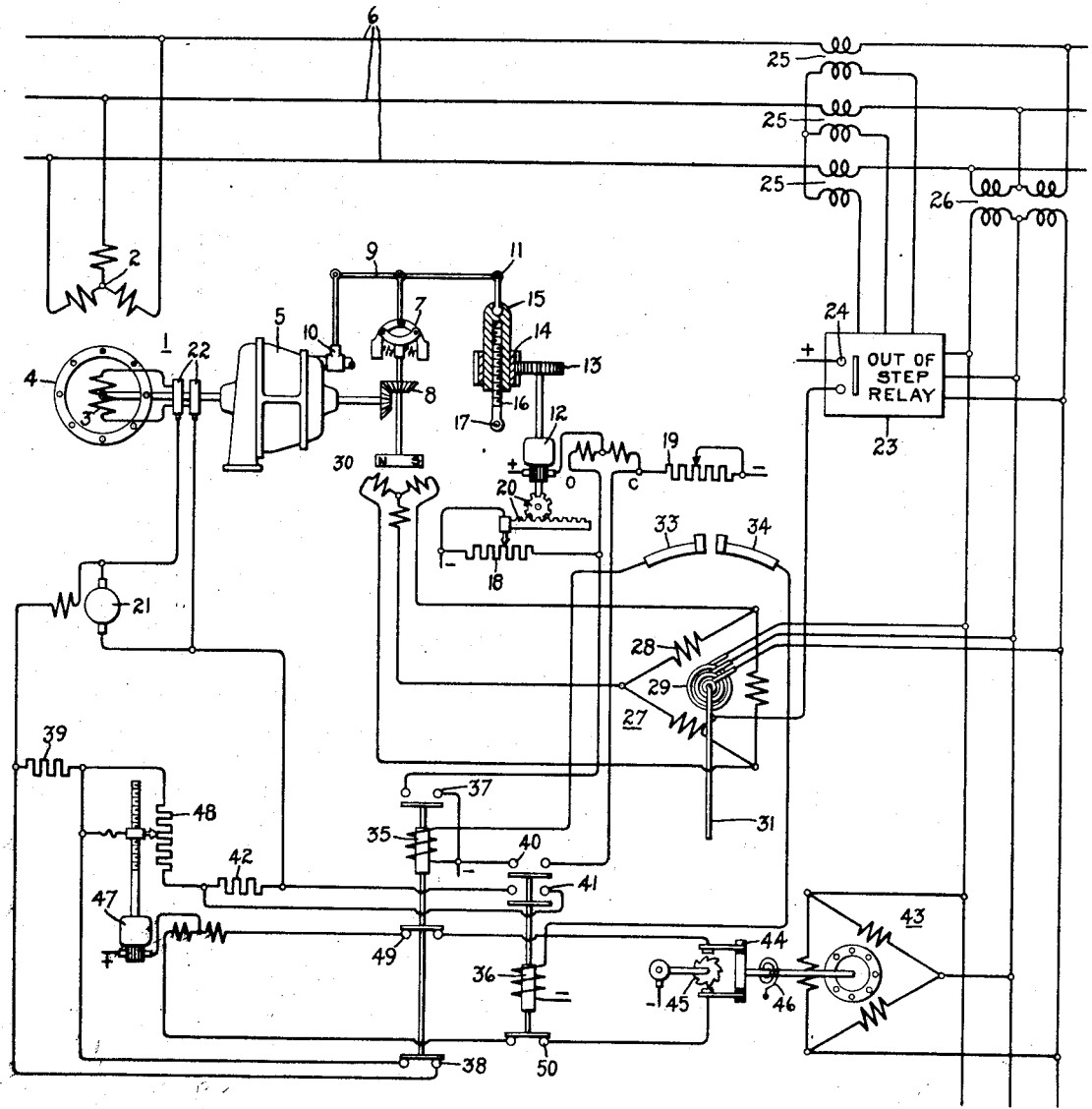

2,363,833

UNITED STATES PATENT OFFICE 2,363,833

SYNCHRONISM CONTROL SYSTEM

Selden B. Crary, Schenectady, N. Y., assignor to General Electric Company, a corporation of New York Application June 11, 1943, Serial No. 490,461

19 Claims. (Cl. 175—294)

This invention relates to control systems and more particularly to improvements in automatic systems for causing synchronous dynamo-electric machines to regain synchronism.

It is well known that when two or more synchronous dynamo-electric machines are connected to the same circuit there is a definite synchronizing torque acting to hold the machines in synchronism. In general this torque is proportional to the excitation of the machines. However, occasionally the mechanical or shaft torque of a machine exceeds the necessary restoring or synchronizing torque following a disturbance, in which case the machine will pull out of step with the system or circuit to which it is connected. For example, the machine may in certain operating conditions or following a disturbance pick up so much electrical load that its prime mover cannot supply it or keep up with it, in which case the machine falls out of step below synchronous speed or below the speed of the other machines of the system.

I have discovered, however, that when the machine is operating subsynchronously in the above-described manner increasing the excitation to high values does not promote the regaining of synchronism and, in fact, I have found that it is exactly the wrong thing to do. This is because the increase in excitation increases the armature current and this increases the load supplied at the frequency of the rotating field and produces a braking torque, which braking torque is proportional to the square of the excitation.

In accordance with this invention, I provide an automatic system in which, when the machine operates below synchronism, the excitation is automatically reduced and the mechanical shaft torque is automatically increased in the speed increasing direction.

In accordance with the preferred embodiment of the invention there is also provided automatic means responsive to overspeed or supersynchronous operation for increasing the excitation and decreasing the shaft torque.

An object of the invention is to provide a new and improved automatic control system.

Another object of the invention is to provide an automatic system for causing synchronous machines to regain synchronism.

The invention will be better understood from the following description taken in connection with the accompanying drawing and its scope will be pointed out in the appended claims.

Referring now to the single figure of the accompanying drawing, wherein there is illustrated diagrammatically an embodiment of the invention, there is shown a synchronous dynamo-electric generator 1 comprising a three-phase armature or stator winding 2 and a direct-current field or exciting winding 3 mounted on a rotor which includes an amortisseur winding 4. The rotor is driven by a prime mover 5 shown, by way of example, as a steam turbine. The armature winding 12 is connected to a three-phase alternating-current power system 6 to which one or more other synchronous machines (not shown) are connected.

The speed torque characteristic of the turbine 5 is controlled by any suitable means, such as a centrifugal governor 7 driven by bevel gears 8 from the turbine shaft. This governor is connected by a linkage 9 to a steam inlet valve 10. The normal fulcrum for the linkage 9 is at 11 and the action of the governor is such that when the turbine speed increases, the left-hand end of the link 9 moves downwardly (in the drawing), thereby to close the valve 10 and when the turbine speed decreases the link moves upwardly thereby to open the steam valve.

In order to adjust the power output of the turbo-generator the position of the fulcrum 11 is adjusted up and down by means of a so-called synchronizing motor 12. This is shown by way of example as a simple split field motor and it is connected to move the point 11 up or down by means of a gear 13 on its shaft which meshes with a gear 14 which rotates a support 15 for the fulcrum 11. This support is internally threaded and is engaged by the threads of a stud 16 whose lower end is fixed at 17. The result is that rotation of the member 15 causes it to move up and down on the threads of 16 thereby to raise and lower the fulcrum 11. This obviously changes the position of the steam valve and therefore changes the power output of the generator 1 which so long as it remains in synchronism will not change its speed and consequently the position of the centrifugal governor 7 will not be affected.

In order that the loading of the turbine generator may be adjusted to any particular value the free terminals of its split field are connected to rheostats 18 and 19 respectively. The rheostat 18 is operated by the motor 12 through a rack and pinion 20 and the rheostat 19 is manually operated. The motor circuit is energized in any suitable manner and, as indicated, one armature brush is connected to the positive side of a direct-current supply source (not shown)

and the free terminals of the rheostats are connected to the negative side of this source. In this manner both halves of the split field are constantly energized and for any setting of the manually operated rheostat 19 the motor will run until it adjusts the rheostat 18 to a resistance value equal to that of the rheostat 19 at which point the current in the two halves of the field will be equal and the motor will come to rest. Thus, the load may be increased or decreased by adjusting the rheostat 19 in one direction or the other. The opposite ends of the split field are labeled O and C indicating opening and closing directions respectively; that is to say, if the half of the split field labeled O carries more current than the half labeled C the turbine valve will tend to open and, conversely, if the half of the split field labeled C carries more current than the other half the valve will tend to close.

The direct current for energizing the field winding 3 may be obtained in any suitable manner and, as shown by way of example, it is obtained from a self-excited shunt-connected exciter 21 whose terminals are connected to the field winding 3 through slip rings 22.

For detecting asynchronous operation of the generator 1 there is provided an out-of-step relay 23 of any suitable type. This relay is provided with a set of normally open contacts 24 which close when the machine has definitely lost synchronism and is definitely operating asynchronously. The relay 23 responds to the three phase currents in the system 6 by means of three current transformers 25 and it responds to the phase voltages of the system by means of suitably connected potential transformers 26. A suitable form of out-of-step relay for discriminating between asynchronous operation on the one hand and load swings or oscillations or fault conditions on the other hand is described and claimed in Patent 2,095,117 granted October 5, 1937, on an application of E. H. Bancker et al. and assigned to the present assignee.

For discriminating between overspeed or supersynchronous operation and underspeed or subsynchronous operation there is provided a differential speed responsive device 27. This device is similar to a three-phase wound rotor induction motor or a differential selsyn device in that it has a polyphase stator winding 28 and a polyphase rotor winding 29. The rotor is shown excited by the voltage of the circuit 6 through the potential transformer 26 and the stator 28 is excited from a tachometer generator 30 driven by the turbine 5. This tachometer generator is shown by way of example as a permanent magnet excited machine. The rotor of the differential speed device 27 carries a movable contact 31 for cooperation with a pair of fixed contacts 33 and 34. When the machine 1 is in synchronism with the system the rotating magnetic fields of the windings 28 and 29 are in synchronism so that there is no torque tending to turn the rotor of the device 27 beyond the normal range of synchronous angular displacement and consequently the contact 31 stays within its normal operating range. However, if the machine 1 loses synchronism the frequency of the output of the generator 30 either increases or decreases with respect to the frequency of the system so that there will be a slip frequency or differential frequency between the fields of the rotor and stator of the device 27 and this will develop a torque causing the contact 31 to move toward either the contact 33 or the contact 34 and if this differential speed continues contact will be made.

Such contact, if sustained, is a reliable indication of whether the deviation in speed is an overspeed or an underspeed condition but it is not as reliable an out-of-step indication as the contacts 24 of the out-of-step relay 23 because the machine 1 can oscillate through a relatively wide angle with respect to the system 6 without actually losing synchronism although such oscillations might cause closing of the contacts of the differential device 27.

In order to restore machine 1 to synchronism in case it loses synchronism a pair of control circuits are completed selectively through the contacts of the out-of-step relay 23 and the differential speed relay 27 in series and these circuits serve to actuate auxiliary relays 35 and 36. Thus, the circuit for the relay 35 is completed from the positive side of the control source through the contacts 24 and the contacts 31—33 in series and through the operating winding of the relay 35 to the negative side of the control source. The other control circuit is completed through the contacts 24 and the contacts 31—34 in series.

The relay 35 which picks up as a result of subsynchronous operation of the machine 1 controls circuits which cause the throttle of the turbine 5 to open and cause the excitation of the machine 1 to decrease. Thus, it is provided with a set of normally open contacts 37 which serve to connect the negative side of the control source directly to the O or opening terminal of the split field of the synchronizing motor and it is provided with a set of normally closed contacts 38 which short circuit a resistor 39 in the field circuit of the exciter 21. Likewise, the relay 36 which picks up on overspeed or supersynchronous operation of the machine 1 controls circuits which reduce the shaft torque of the turbine 5 and which increase the excitation of the machine 1. Thus, it is provided with a set of normally open contacts 40 which serve to connect the negative side of the control source directly to the C or throttle closing terminal of the split field of the synchronizing motor and it is provided with another set of normally open contacts 41 which serve when closed to short circuit a resistor 42 in the field circuit of the exciter 21.

In many cases it will be desirable to provide the machine 1 with an automatic voltage regulator and a suitable form of regulator is illustrated in the drawing as comprising a torque motor 43 responsive to the circuit voltage. The rotor of this torque motor is connected to a contact carrying yoke 44 on which are mounted raise and lower contacts which cooperate respectively with a center contact 45. The torque of the motor is balanced by a spring 46. The raise and lower contacts are connected respectively to the raise and lower terminals of the split field of a reversible motor 47 for operating a rheostat 48 in the field circuit of the exciter 21. In order to prevent a conflict between the operation of the voltage regulator and the operation of the synchronism restoring means the relays 35 and 36 are provided with additional normally closed contacts 49 and 50 which are respectively in the raise and lower circuits of the voltage regulator. Consequently, when the relay 35 is picked up so as to cause a decrease in excitation the raising circuit of the regulator is opened and similarly when the relay 36 is picked up so as to cause an increase in excitation the lowering circuit of the regulator is opened.

The operation of the illustrated embodiment of the invention will be obvious from the preceding description. It is to be noted, however, that as soon as synchronism is restored and the relays 35 and 36 drop out the synchronizing motor 12 will again be under the control of the rheostats 18 and 19 so that the motor will return the throttle and consequently will return the loading of the machine 1 to the condition corresponding to that for which adjusting rheostat 19 has previously been set. Similarly, it will also be noted that the dropping out of these relays restores the excitation to the control of the automatic voltage regulator so that temporary under- or overvoltage conditions which may result from the operation of the system while the machine 1 is out of synchronism will be corrected.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a synchronous-to-synchronous power system, a synchronous dynamo-electric machine, means for controlling the shaft torque of said machine, means for controlling the excitation of said machine, and means responsive to supersynchronous operation of said machine for causing said torque controlling means to provide a deceleration producing change in torque and for causing said excitation controlling means to increase the excitation.

2. In a synchronous-to-synchronous power system, a synchoronous dynamo-electric machine, means for controlling the shaft torque of said machine, means for controlling the excitation of said machine, and means responsive to subsynchronous operation of said machine for causing said torque controlling means to provide an acceleration producing change in torque and for causing said excitation controlling means to decrease the excitation.

3. In a synchronous-to-synchronous power system, a synchronous dynamo-electric machine, means for controlling the shaft torque of said machine, means for controlling the excitation of said machine, means responsive to supersynchronous operation of said machine for causing said torque controlling means to provide a deceleration producing change in torque and for causing said excitation controlling means to increase the excitation, and means responsive to subsynchronous operation of said machine for causing said torque controlling means to provide an acceleration producing change in torque and for causing said excitation controlling means to decrease the excitation.

4. In a synchronous-to-synchronous power system, a synchronous dynamo-electric machine, means for controlling the shaft torque of said machine, means for controlling the excitation of said machine, an automatic regulator of an electrical condition of said machine for operating said excitation controlling means, and means responsive to supersynchronous operation of said machine for causing said torque controlling means to provide a deceleration producing change in torque and for causing said excitation controlling means to increase the excitation regardless of the action of said regulator.

5. In a synchronous-to-synchronous power system, a synchronous dynamo-electric machine, means for controlling the shaft torque of said machine, means for controlling the excitation of said machine, an automatic regulator of an electrical condition of said machine for operating said excitation controlling means, and means responsive to subsynchronous operation of said machine for causing said torque controlling means to provide an acceleration producing change in torque and for causing said excitation controlling means to decrease the excitation regardless of the action of said regulator.

6. In a synchronous-to-synchronous power system, a synchronous dynamo-electric machine, means for controlling the shaft torque of said machine, means for controlling the excitation of said machine, and automatic voltage regulator for operating said excitation controlling means, means responsive to supersynchronous operation of said machine for causing said torque controlling means to provide a deceleration producing change in torque and for causing said excitation controlling means to increase the excitation, and means responsive to subsynchronous operation of said machine for causing said torque controlling means to provide an acceleration producing change in torque and for causing said excitation controlling means to decrease the excitation regardless of the action of said regulator.

7. In a synchronous-to-synchronous power system, a synchronous dynamo-electric machine, means for controlling the shaft torque of said machine, means for controlling the excitation of said machine, and means responsive to supersynchronous operation of said machine for causing said torque controlling means to provide a deceleration producing change in torque and for causing said excitation controlling means to increase the excitation, said means responsive to supersynchronous operation including means responsive to out-of-step operation of said machine and means for discriminating between overspeed and underspeed operation of said machine.

8. In a synchronous-to-synchronous power system, a synchronous dynamo-electric machine, means for controlling the shaft torque of said machine, means for controlling the excitation of said machine, and means responsive to subsynchronous operation of said machine for causing said torque controlling means to provide an acceleration producing change in torque and for causing said excitation controlling means to decrease the excitation, said means responsive to subsynchronous operation including means responsive to out-of-step operation of said machine and means for discriminating between overspeed and underspeed operation of said machine.

9. In a synchronous-to-synchronous power system, a synchronous dynamo-electric machine, means for controlling the shaft torque of said machine, means for controlling the excitation of said machine, means responsive to supersynchronous operation of said machine for causing said torque controlling means to provide a deceleration producing change in torque and for causing said excitation controlling means to increase the excitation, and means responsive to subsynchronous operation of said machine for causing said torque controlling means to provide an acceleration producing change in torque and for causing said excitation controlling means to decrease the excitation, said means responsive to supersynchronous operation including means responsive to out-of-step operation of said machine and means for discriminating between overspeed and underspeed operation of said machine.

10. In a synchronous alternating-current power system, a synchronous generator, a prime mover therefor, means for controlling the excitation of said generator, means for controlling the torque of said prime mover, and means responsive to supersynchronous operation of said generator for causing said excitation controlling means to increase the excitation and for causing said torque controlling means to decrease the torque while maintaining said generator connected to the system.

11. In a synchronous alternating-current power system, a synchronous generator, a prime mover therefor, means for controlling the excitation of said generator, means for controlling the torque of said prime mover, and means responsive to subsynchronous operation of said generator for causing said excitation controlling means to reduce the excitation and for causing said torque controlling means to increase the torque while maintaining said generator connected to the system.

12. In a synchronous alternating-current power system, a synchronous generator, a prime mover therefor, means for controlling the excitation of said generator, means for controlling the torque of said prime mover, means responsive to supersynchronous operation of said generator for causing said excitation controlling means to increase the excitation and for causing said torque controlling means to decrease the torque while maintaining said generator connected to the system, and means responsive to subsynchronous operation of said generator for causing said excitation controlling means to reduce the excitation and for causing said torque controlling means to increase the torque while maintaining said generator connected to the system.

13. In a synchronous alternating-current power system, a synchronous generator, a prime mover therefor, means for controlling the excitation of said generator, an automatic regulator of an electrical condition of said machine for operating said excitation controlling means, means for controlling the torque of said prime mover, and means responsive to supersynchronous operation of said generator for causing said excitation controlling means to increase the excitation and for causing said torque controlling means to decrease the torque regardless of the action of said regulator while maintaining said generator connected to the system.

14. In a synchronous alternating-current power system, a synchronous generator, a prime mover therefor, means for controlling the excitation of said generator, an automatic regulator of an electrical condition of said machine for operating said excitation controlling means, means for controlling the torque of said prime mover, and means responsive to subsynchronous operation of said generator for causing said excitation controlling means to reduce the excitation and for causing said torque controlling means to increase the torque regardless of the action of said regulator while maintaining said generator connected to the system.

15. In a synchronous alternating-current power system, a synchronous generator, a prime mover therefor, means for controlling the excitation of said generator, an automatic voltage regulator for operating said excitation controlling means, means for controlling the torque of said prime mover, means responsive to supersynchronous operation of said generator for causing said excitation controlling means to increase the excitation and for causing said torque controlling means to decrease the torque, and means responsive to subsynchronous operation of said generator for causing said excitation controlling means to reduce the excitation and for causing said torque controlling means to increase the torque regardless of the action of said regulator while maintaining said generator connected to the system.

16. In a synchronous alternating-current power system, a synchronous generator, a prime mover therefor, means for controlling the excitation of said generator, means for controlling the torque of said prime mover, and means responsive to supersynchronous operation of said generator for causing said excitation controlling means to increase the excitation and for causing said torque controlling means to decrease the torque, said means responsive to supersynchronous operation including means responsive to out-of-step operation of said generator and means for discriminating between overspeed and underspeed operation of said generator while maintaining said generator connected to the system.

17. In a synchronous alternating-current power system, a synchronous generator, a prime mover therefor, means for controlling the excitation of said generator, means for controlling the torque of said prime mover, and means responsive to subsynchronous operation of said generator for causing said excitation controlling means to reduce the excitation and for causing said torque controlling means to increase the torque, said means responsive to supersynchronous operation including means responsive to out-of-step operation of said generator and means for discriminating between overspeed and underspeed operation of said generator while maintaining said generator connected to the system.

18. In a synchronous alternating-current power system, a synchronous generator, a prime mover therefor, means for controlling the excitation of said generator, means for controlling the torque of said prime mover, means responsive to supersynchronous operation of said generator for causing said excitation controlling means to increase the excitation and for causing said torque controlling means to decrease the torque, and means responsive to subsynchronous operation of said generator for causing said excitation controlling means to reduce the excitation and for causing said torque controlling means to increase the torque, said means responsive to supersynchronous operation including means responsive to out-of-step operation of said generator and means for discriminating between overspeed and underspeed operation of said generator while maintaining said generator connected to the system.

19. In combination, a synchronous alternating-current power system, a synchronous generator connected thereto, a prime mover for said generator, a rheostat for controlling the excitation of said generator, a governor synchronizing motor for controlling the torque of said prime mover, an automatic voltage regulator for said generator for controlling said rheostat, an out-of-step relay for responding to asynchronous operation of said generator, differential speed responsive means for discriminating between over and underspeed operation of said machine with respect to the rest of the system, means jointly responsive to said relay and differential speed means when said machine is operating supersynchronously for operating said rheostat to increase the excitation regardless of the action of said regulator and for operating said motor to reduce the torque of said prime mover, and means jointly responsive to said relay and differential speed means when said machine is operating subsynchronously for operating said rheostat to decrease the excitation regardless of the actio of said regulator and for operating said motor to increase the torque of said prime mover.

SELDEN B. CRARY.